(12) United States Patent
Kurganov (10) Patent No.: US 7,516,190 B2
(45) Date of Patent: Apr. 7, 2009

(54) PERSONAL VOICE-BASED INFORMATION RETRIEVAL SYSTEM

(75) Inventor: Alexander Kurganov, Buffalo Grove, IL (US)

(73) Assignee: Parus Holdings, Inc., Bannockburn, IL (US)

( * ) Notice: Subject to any disclaimer, the term of this patent is extended or adjusted under 35 U.S.C. 154(b) by 458 days.

(21) Appl. No.: 09/777,406

(22) Filed: Feb. 6, 2001

(65) Prior Publication Data

US 2001/0054085 A1 Dec. 20, 2001

Related U.S. Application Data

(60) Provisional application No. 60/180,343, filed on Feb. 4, 2000.

(51) Int. Cl.
*G06F 15/16* (2006.01)
*G10L 21/00* (2006.01)

(52) U.S. Cl. .............. 709/217; 709/203; 704/270.1; 704/275

(58) Field of Classification Search ............... 709/218, 709/219, 317, 224, 203; 379/105, 67, 88; 370/354, 79; 179/2 A, 18; 364/188, 514; 455/417; 704/275, 270.1
See application file for complete search history.

(56) References Cited

U.S. PATENT DOCUMENTS

| | | | |
|---|---|---|---|
| 4,313,035 A | 1/1982 | Jordan et al. ................... 179/18 |
| 4,585,906 A | 4/1986 | Matthews et al. .............. 179/18 |
| 4,596,900 A | 6/1986 | Jackson ....................... 179/2 A |
| 4,696,028 A | 9/1987 | Morganstein et al. .......... 379/88 |
| 4,761,807 A | 8/1988 | Matthews et al. .............. 379/89 |
| 4,776,016 A | 10/1988 | Hansen ......................... 381/42 |
| 4,809,321 A | 2/1989 | Morganstein et al. ........ 379/211 |
| 4,837,798 A | 6/1989 | Cohen et al. ................... 379/88 |
| 4,850,012 A | 7/1989 | Mehta et al. ................. 379/157 |
| 4,873,719 A | 10/1989 | Reese .......................... 379/215 |
| 4,907,079 A | 3/1990 | Turner et al. ................... 358/84 |
| 4,922,526 A | 5/1990 | Morganstein et al. ....... 379/157 |

(Continued)

FOREIGN PATENT DOCUMENTS

| | | |
|---|---|---|
| GB | 2317782 | 1/1998 |
| WO | 96/09710 | 3/1996 |
| WO | WO 97/37481 | 10/1997 |
| WO | 98/23058 | 5/1998 |

OTHER PUBLICATIONS

Ly, "Chatter A: A Conversational Telephone Agent," submitted to *Program in Media Arts and Sciences*, Massachusetts Institute of Technology, (1993), pp. 1-130.

(Continued)

*Primary Examiner*—William C Vaughn, Jr.
*Assistant Examiner*—Kristie D Shingles
(74) *Attorney, Agent, or Firm*—Foley & Lardner LLP (57) ABSTRACT

The present invention relates to a system for retrieving information from a network such as the Internet. A user creates a user-defined record in a database that identifies an information source, such as a web site, containing information of interest to the user. This record identifies the location of the information source and also contains a recognition grammar based upon a speech command assigned by the user. Upon receiving the speech command from the user that is described within the recognition grammar, a network interface system accesses the information source and retrieves the information requested by the user.

21 Claims, 5 Drawing Sheets

U.S. PATENT DOCUMENTS

| | | | |
|---|---|---|---|
| 4,933,966 A | 6/1990 | Hird et al. | 379/132 |
| 4,935,958 A | 6/1990 | Morganstein et al. | 379/372 |
| 4,953,204 A | 8/1990 | Cuschleg, Jr. et al. | 379/266 |
| 4,955,047 A | 9/1990 | Morganstein et al. | 379/112 |
| 4,972,462 A | 11/1990 | Shibata | 379/89 |
| 4,975,941 A | 12/1990 | Morganstein et al. | 379/88 |
| 4,994,926 A | 2/1991 | Gordon et al. | 358/400 |
| 5,020,095 A | 5/1991 | Morganstein et al. | 379/67 |
| 5,027,384 A | 6/1991 | Morganstein et al. | 379/67 |
| 5,029,196 A | 7/1991 | Morganstein | 379/67 |
| 5,086,385 A | 2/1992 | Launey et al. | 364/188 |
| 5,099,509 A | 3/1992 | Morganstein et al. | 379/84 |
| 5,109,405 A | 4/1992 | Morganstein | 379/89 |
| 5,131,024 A | 7/1992 | Pugh et al. | 379/67 |
| 5,166,974 A | 11/1992 | Morganstein et al. | 379/67 |
| 5,195,086 A | 3/1993 | Baumgartner et al. | 370/264 |
| 5,243,645 A | 9/1993 | Bissell et al. | 379/211 |
| 5,249,219 A | 9/1993 | Morganstein et al. | 379/84 |
| 5,263,084 A | 11/1993 | Chaput et al. | 379/215 |
| 5,291,302 A | 3/1994 | Gordon et al. | 358/400 |
| 5,291,479 A | 3/1994 | Vaziri | |
| 5,303,298 A | 4/1994 | Morganstein et al. | 379/67 |
| 5,307,399 A | 4/1994 | Dai | |
| 5,309,504 A | 5/1994 | Morganstein et al. | 379/67 |
| 5,325,421 A | 6/1994 | Hou et al. | 379/67 |
| 5,327,486 A | 7/1994 | Wolff et al. | 379/96 |
| 5,327,529 A | 7/1994 | Fults et al. | 395/155 |
| 5,329,578 A | 7/1994 | Brennan et al. | 379/67 |
| 5,333,266 A | 7/1994 | Boaz et al. | 709/206 |
| 5,347,574 A | 9/1994 | Morganstein et al. | 379/210 |
| 5,355,403 A | 10/1994 | Richardson, Jr. et al. | 379/88 |
| 5,375,161 A | 12/1994 | Fuller et al. | 379/57 |
| 5,384,771 A | 1/1995 | Isidoro et al. | 370/58.2 |
| 5,404,231 A | 4/1995 | Bloomfield | 358/400 |
| 5,408,526 A | 4/1995 | McFarland et al. | 379/202 |
| 5,414,754 A | 5/1995 | Pugh et al. | 379/67 |
| 5,436,963 A | 7/1995 | Fitzpatrick et al. | 379/212 |
| 5,459,584 A | 10/1995 | Gordon et al. | 358/434 |
| 5,463,684 A | 10/1995 | Morduch et al. | 379/202 |
| 5,475,791 A | 12/1995 | Schalk et al. | 395/2.42 |
| 5,497,373 A | 3/1996 | Hulen et al. | 370/79 |
| 5,499,288 A | 3/1996 | Hunt et al. | 379/88 |
| 5,517,558 A | 5/1996 | Schalk | 379/88 |
| 5,555,100 A | 9/1996 | Bloomfield | 358/402 |
| 5,559,611 A | 9/1996 | Bloomfield et al. | 358/407 |
| 5,559,859 A | 9/1996 | Dai | |
| 5,566,236 A | 10/1996 | MeLampy et al. | 379/201 |
| 5,603,031 A | 2/1997 | White et al. | 709/317 |
| 5,608,786 A | 3/1997 | Gordon | 379/100 |
| 5,610,970 A | 3/1997 | Fuller et al. | 455/417 |
| 5,611,031 A | 3/1997 | Hertzfeld et al. | 345/433 |
| 5,652,789 A | 7/1997 | Miner et al. | 379/201 |
| 5,657,376 A | 8/1997 | Espeut et al. | |
| 5,659,597 A | 8/1997 | Bareis | 455/563 |
| 5,666,401 A | 9/1997 | Morganstein et al. | 379/67 |
| 5,675,507 A | 10/1997 | Bobo, II | 364/514 R |
| 5,675,811 A | 10/1997 | Broedner et al. | 395/750 |
| 5,689,669 A | 11/1997 | Lynch et al. | 345/355 |
| 5,692,187 A | 11/1997 | Goldman et al. | 395/619 |
| 5,699,486 A * | 12/1997 | Tullis et al. | 704/270.1 |
| 5,719,921 A | 2/1998 | Vystosky et al. | 379/88 |
| 5,721,908 A * | 2/1998 | Lagarde et al. | 707/10 |
| 5,724,408 A | 3/1998 | Morganstein et al. | 379/88 |
| 5,742,905 A | 4/1998 | Pepe et al. | 455/461 |
| 5,752,191 A | 5/1998 | Fuller et al. | 455/445 |
| 5,787,298 A | 7/1998 | Broedner et al. | 395/750 |
| 5,793,993 A | 8/1998 | Broedner et al. | 395/306 |
| 5,799,065 A | 8/1998 | Junqua et al. | |
| 5,809,282 A | 9/1998 | Cooper et al. | 359/500 |
| 5,812,796 A | 9/1998 | Broedner et al. | 395/283 |
| 5,819,220 A * | 10/1998 | Sarukkai et al. | 704/270.1 |
| 5,819,306 A | 10/1998 | Goldman et al. | 711/100 |
| 5,867,494 A | 2/1999 | Krishnaswamy et al. | 370/352 |
| 5,867,495 A | 2/1999 | Elliott et al. | 370/352 |
| 5,873,080 A | 2/1999 | Coden et al. | 707/3 |
| 5,881,134 A | 3/1999 | Foster et al. | 379/88 |
| 5,884,262 A | 3/1999 | Wise et al. | 704/270 |
| 5,884,266 A * | 3/1999 | Dvorak | 704/270.1 |
| 5,890,123 A * | 3/1999 | Brown et al. | 704/270.1 |
| 5,915,001 A * | 6/1999 | Uppaluru | 379/88.22 |
| 5,953,392 A * | 9/1999 | Rhie et al. | 379/88.13 |
| 5,974,413 A | 10/1999 | Beauregard et al. | 707/6 |
| 5,999,525 A | 12/1999 | Krishnaswamy et al. | 370/352 |
| 6,012,088 A | 1/2000 | Li et al. | 709/219 |
| 6,014,437 A | 1/2000 | Acker et al. | 379/219 |
| 6,018,710 A | 1/2000 | Wynblatt et al. | 704/260 |
| 6,021,181 A | 2/2000 | Miner et al. | 379/88.23 |
| 6,031,904 A | 2/2000 | An et al. | 379/201 |
| 6,038,305 A | 3/2000 | McAllister et al. | 379/207 |
| 6,047,053 A | 4/2000 | Miner et al. | 379/201 |
| 6,078,580 A | 6/2000 | Mandalia et al. | 370/352 |
| 6,081,518 A | 6/2000 | Bowman-Amuah | 370/352 |
| 6,091,808 A | 7/2000 | Wood et al. | 379/201 |
| 6,101,472 A * | 8/2000 | Giangarra et al. | 704/275 |
| 6,104,803 A | 8/2000 | Weser et al. | 379/230 |
| 6,115,742 A | 9/2000 | Franklin et al. | 709/224 |
| 6,208,638 B1 | 3/2001 | Rieley et al. | 370/354 |
| 6,233,318 B1 | 5/2001 | Picard et al. | 379/88.17 |
| 6,243,373 B1 | 6/2001 | Turock | 370/352 |
| 6,252,944 B1 | 6/2001 | Hansen, II et al. | 379/88.17 |
| 6,269,336 B1 * | 7/2001 | Ladd et al. | 704/270 |
| 6,285,745 B1 | 9/2001 | Bartholomew et al. | 379/88.17 |
| 6,327,572 B1 * | 12/2001 | Morton et al. | 705/10 |
| 6,349,132 B1 * | 2/2002 | Wesemann et al. | 379/88.17 |
| 6,353,661 B1 * | 3/2002 | Bailey, III | 379/93.25 |
| 6,366,578 B1 | 4/2002 | Johnson | 370/353 |
| 6,434,529 B1 * | 8/2002 | Walker et al. | 704/275 |
| 6,446,076 B1 * | 9/2002 | Burkey et al. | 707/102 |
| 6,456,699 B1 * | 9/2002 | Burg et al. | 379/88.17 |
| 6,477,420 B1 | 11/2002 | Struble et al. | 379/67.1 |
| 6,505,163 B1 | 1/2003 | Zhang et al. | 704/275 |
| 6,529,948 B1 * | 3/2003 | Bowman-Amuah | 709/217 |
| 6,532,444 B1 * | 3/2003 | Weber | 704/257 |
| 6,539,359 B1 * | 3/2003 | Ladd et al. | 704/275 |
| 6,546,393 B1 | 4/2003 | Khan | 707/10 |
| 6,594,348 B1 * | 7/2003 | Bjurstrom et al. | 379/88.13 |
| 6,618,726 B1 * | 9/2003 | Colbath et al. | 707/6 |
| 6,636,831 B1 | 10/2003 | Profit et al. | 704/275 |
| 6,665,640 B1 * | 12/2003 | Bennett et al. | 704/257 |
| 6,687,341 B1 * | 2/2004 | Koch et al. | 379/88.17 |
| 6,718,015 B1 * | 4/2004 | Berstis | 379/88.17 |
| 6,732,142 B1 | 5/2004 | Bates et al. | 709/203 |
| 6,771,743 B1 * | 8/2004 | Butler et al. | 379/67.1 |
| 6,823,370 B1 * | 11/2004 | Kredo et al. | 709/206 |
| 6,888,929 B1 * | 5/2005 | Saylor et al. | 379/88.16 |
| 6,922,733 B1 | 7/2005 | Kuiken et al. | 709/246 |
| 6,941,273 B1 * | 9/2005 | Loghmani et al. | 705/26 |
| 6,964,012 B1 * | 11/2005 | Zirngibl et al. | 715/513 |
| 6,965,864 B1 * | 11/2005 | Thrift et al. | 704/275 |
| 6,996,609 B2 * | 2/2006 | Hickman et al. | 709/218 |
| 7,050,977 B1 * | 5/2006 | Bennett | 704/270.1 |
| 2001/0032234 A1 * | 10/2001 | Summers et al. | 709/201 |
| 2001/0048676 A1 * | 12/2001 | Jimenez et al. | 370/352 |
| 2002/0006126 A1 * | 1/2002 | Johnson et al. | 370/356 |

OTHER PUBLICATIONS

Schmandt et al., "Phone Slave: A Graphical Telecommunications Interface," *Proceedings of the SID* (1985), vol. 26/1, pp. 79-82.
Don Hunt and Brian Edwards "*Long-Distance Remote Control to the Rescue.*" Chicago Tribune, Jun. 15, 2002, Section 4, p. 15.

* cited by examiner

PERSONAL VOICE-BASED INFORMATION RETRIEVAL SYSTEM

CROSS-REFERENCE TO RELATED APPLICATIONS

This application is related to U.S. Provisional Application Ser. No. 60/180,343, filed Feb. 4, 2000 entitled "Personal Voice-Based Information Retrieval System."

FIELD OF THE INVENTION

The present invention relates generally to the field of providing information access. In particular, the invention relates to a personalized system for accessing information from the Internet or other information sources using speech commands.

BACKGROUND OF THE INVENTION

Popular methods of information access and retrieval using the Internet or other computer networks can be time-consuming and complicated. A user must frequently wade through vast amounts of information provided by an information source or web site in order obtain a small amount of relevant information. This can be time-consuming, frustrating, and, depending on the access method, costly. A user is required to continuously identify reliable sources of information and, if these information sources are used frequently, repeatedly access these sources.

Current methods of accessing information stored on computer networks, such as Wide Area Networks (WANs), Local Area Network (LANs) or the Internet, require a user to have access to a computer. While computers are becoming increasingly smaller and easier to transport, using a computer to access information is still more difficult than simply using a telephone. Since speech recognition systems allow a user to convert his voice into a computer-usable message, telephone access to digital information is becoming more and more feasible. Voice recognition technology is growing in its ability to allow users to use a wide vocabulary. Further, such technology is quite accurate when a single, known user only needs to use a small vocabulary.

Therefore, a need exists for an information access and retrieval system and method that allows users to access frequently needed information from information sources on networks by using a telephone and simple speech commands.

SUMMARY OF THE INVENTION

One object of the preferred embodiment of the present invention is to allow users to customize a voice browsing system.

A further object of the preferred embodiment is to allow users to customize the information retrieved from the Internet or other computer networks and accessed by speech commands over telephones.

Another object of the preferred embodiment is to provide a secure and reliable retrieval of information over the Internet or other computer networks using predefined verbal commands assigned by a user.

The present invention provides a solution to these and other problems by providing a new system for retrieving information from a network such as the Internet. A user creates a user-defined record in a database that identifies an information source, such as a web site, containing information of interest to the user. This record identifies the location of the information source and also contains a recognition grammar assigned by the user. Upon receiving a speech command from the user that is described in the assigned recognition grammar, a network interface system accesses the information source and retrieves the information requested by the user.

In accordance with the preferred embodiment of the present invention, a customized, voice-activated information access system is provided. A user creates a descriptor file defining specific information found on a web site the user would like to access in the future. The user then assigns a pronounceable name or identifier to the selected content and this pronounceable name is saved in a user-defined database record as a recognition grammar along with the URL of the selected web site.

In the preferred embodiment, when a user wishes to retrieve the previously defined web-based information, a telephone call is placed to a media server. The user provides speech commands to the media server that are described in the recognition grammar assigned to the desired search. Based upon the recognition grammar, the media server retrieves the user-defined record from a database and passes the information to a web browsing server which retrieves the information from associated web site. The retrieved information is then transmitted to the user using a speech synthesis software engine.

DETAILED DESCRIPTION OF THE PREFERRED EMBODIMENT

The present invention uses various forms of signal and data transmission to allow a user to retrieve customized information from a network using speech communication. In the preferred embodiment of the present invention, a user associates information of interest found on a specific information source, such as a web site, with a pronounceable name or identification word. This pronounceable name/identification word forms a recognition grammar in the preferred embodiment. When the user wishes to retrieve the selected information, he may use a telephone or other voice enabled device to access a voice browser system. The user then speaks a command described in the recognition grammar associated with the desired information. The voice browsing system then accesses the associated information source and returns to the user, using a voice synthesizer, the requested information.

Figure 1:
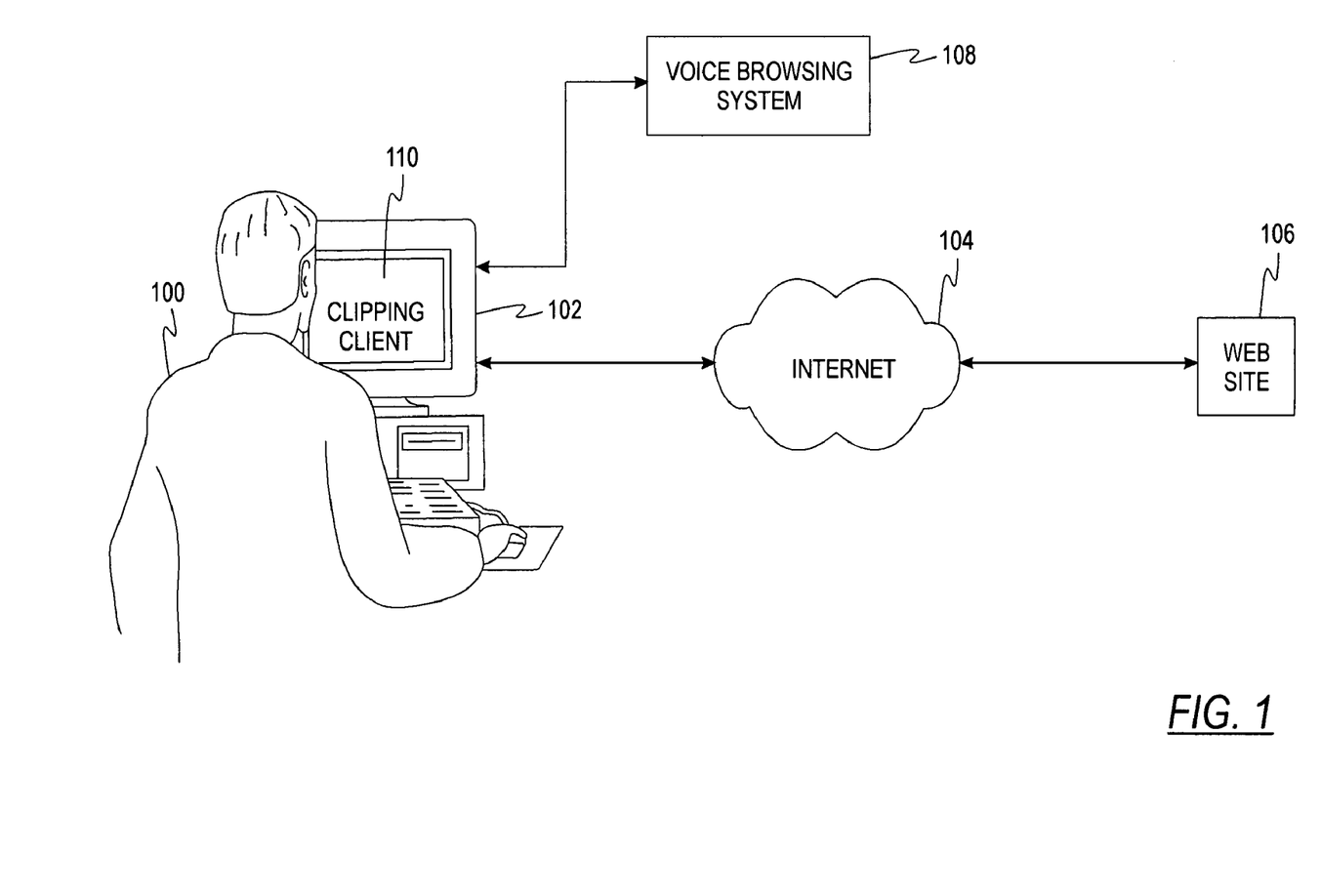
FIG. 1 displays a personal information selection system used with the preferred embodiment of the present invention.

Referring to FIG. 1, a user 100 uses a computer 102 to access a network, such as a WAN, LAN, or the Internet, containing various information sources. In the preferred embodiment, the user 100 access the Internet 104 and begins searching for web sites 106, which are information sources that contain information of interest to the user. When the user 100 identifies a web site 106 containing information the user would like to access using only a voice enabled device, such as a telephone, and the voice browsing system 108, the user initiates a "clipping client" engine 110 on his computer 102.

The clipping client 110 allows a user 100 to create a set of instructions for use by the voice browsing system 108 in order to report personalized information back to the user upon request. The instruction set is created by "clipping" information from the identified web site A user 100 may be interested in weather for a specific city, such as Chicago. The user 100 identifies a web site from which he would like to obtain the latest Chicago weather information. The clipping client 110 is then activated by the user 100.

Figure 2:
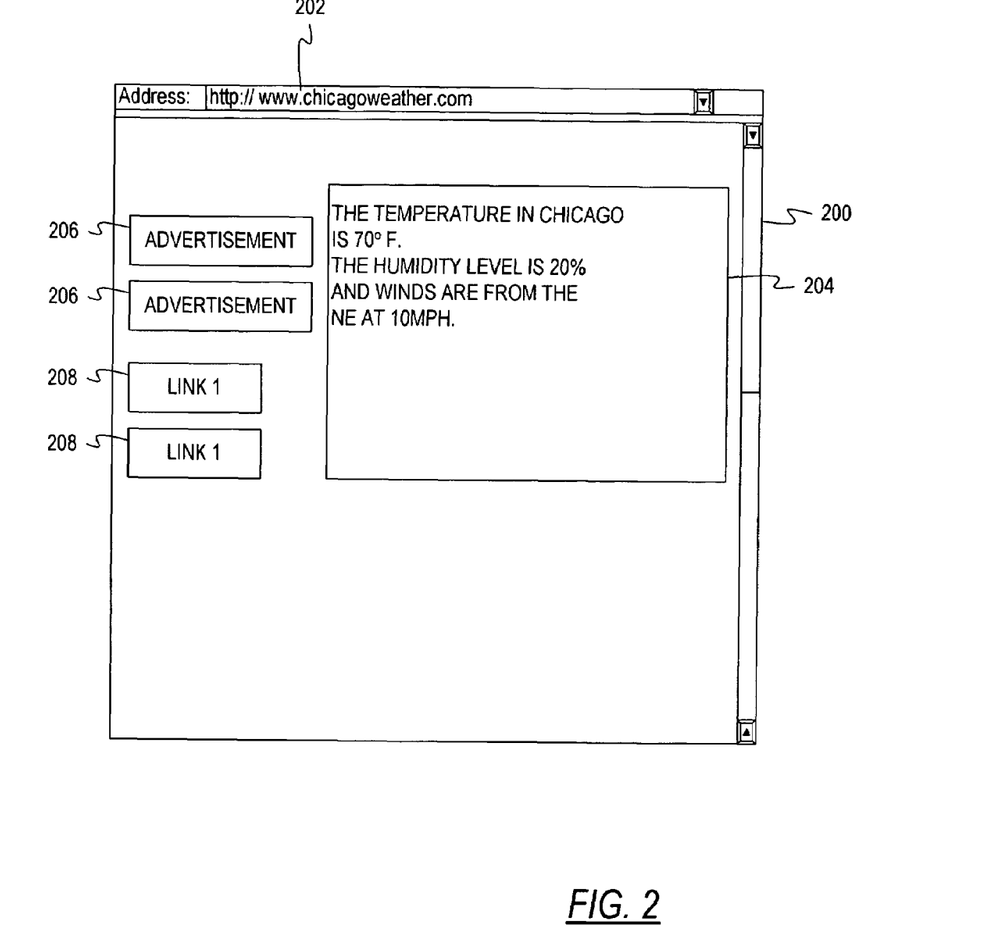
FIG. 2 displays a web page displayed by the clipping client of the preferred embodiment.

The clipping client 110 displays the selected web site in the same manner as a conventional web browser such as Microsoft's® Internet Explorer. FIG. 2 depicts a sample of a web page 200 displayed by the clipping client 110. The user 100 begins creation of the instruction set for retrieving information from the identified web site by selecting the uniform resource locator (URL) address 202 for the web site (i.e., the web site address). In the preferred embodiment, this selection is done by highlighting and copying the URL address 202. Next, the user selects the information from the displayed web page that he would like to have retrieved when a request is made. Referring to FIG. 2, the user would select the information regarding the weather conditions in Chicago 204. The web page 200 may also contain additional information such as advertisements 206 or links to other web sites 208 which are not of interest to the user. The clipping client 110 allows the user to select only that portion of the web page containing information of interest to the user. Therefore, unless the advertisements 206 and links 208 displayed on the web page are of interest to the user, he would not select this information. Based on the web page information 204 selected by the user, the clipping client 110 creates a content descriptor file containing a description of the content of the selected web page. This content descriptor file indicates where the information selected by the user is located on the web page. In the preferred embodiment, the content descriptor file is stored within the web browsing server 302 shown in FIG. 3. The web browsing server 302 will be discussed below.

Table 1 below is an example of a content descriptor file created by the clipping client of the preferred embodiment. This content descriptor file relates to obtaining weather information from the web site www.cnn.com.

TABLE 1 table name : portalServices
column :
　　service
content:
　　　　weather
column:
　　config
content:
　　[cnn]
　　Input=_zip
　　URL=http://cgi.cnn.com/cgi-bin/weather/redirect?zip=_zip
　　Pre-filter="\n"　"
　　Pre-filter="<[^<>]+>"　"
　　Pre-filter=/\s+/ /
　　Pre-filter=" [\(\)\|]" ! "
　　Output=_location
　　Output=first_day_name
　　Output=first_day_weather
　　Output=first_day_high_F
　　Output=first_day_high_C
　　Output=first_day_low_F
　　Output=first_day_low_C
　　Output=second_day_name
　　Output=second_day_weather
　　Output=second_day_high_F TABLE 1-continued Output=second_day_high_C
　　Output=second_day_low_F
　　Output=second_day_low_C
　　Output=third_day_name
　　Output=third_day_weather
　　Output=third_day_high_F
　　Output=third_day_high_C
　　Output=third_day_low_F
　　Output=third_day_low_C
　　Output=fourth_day_name
　　Output=fourth_day_weather
　　Output=fourth_day_high_F
　　Output=fourth_day_high_C
　　Output=fourth_day_low_F
　　Output=fourth_day_low_C
　　Output=undef
　　Output=_current_time
　　Output=_current_month
　　Output=_current_day
　　Output=_current_weather
　　Output=_current_temperature_F
　　Output=_current_temperature_C
　　Output=_humidity
　　Output=_wind
　　Output=_pressure
　　Output=_sunrise
　　Output=_sunset
　　Regular_expression=WEB SERVICES: (.+) Forecast FOUR-DAY FORECAST (\S+)
(\S+) HI
GH (\S+) F (\S+) C LOW (\S+) F (\S+) C (\S+) (\S+) HIGH (\S+) F (\S+) C LOW
(\S+
) F (\S+) C (\S+) (\S+) HIGH (\S+) F (\S+) C LOW (\S+) F (\S+) C (\S+) (\S+)
HIG
H (\S+) F (\S+) C LOW (\S+) F (\S+) C WEATHER MAPS RADAR (.+) Forecast
CURRENT C
ONDITIONS (.+) !local!, (\S+) (\S+) (.+) Temp: (\S+) F, (\S+) C Rel.
Humidity: (
\S+) Wind: (.+) Pressure: (.+) Sunrise: (.+) Sunset: (.+)

Finally, the clipping client 110 prompts the user to enter an identification word or phrase that will be associated with the identified web site and information. For example, the user could associate the phrase "Chicago weather" with the selected URL 202 and related weather information 204. The identification word or phrase is stored as a personal recognition grammar that can now be recognized by a speech recognition engine of the voice browsing system 108 which will be discussed below. The personal recognition grammar, URL address 202, and a command for executing a content extraction agent are stored within a database used by the voice browser system 108 which will be discussed below.

The voice browsing system 108 used with the preferred embodiment will now be described in relation to FIG. 3. A database 300 designed by Webley Systems Incorporated is connected to one or more web browsing servers 302 as well as to one or more media servers 304. The database may store information on magnetic media, such as a hard disk drive, or it may store information via other widely acceptable methods for storing data, such as optical disks. The media servers 304 function as user interface systems that provide access to the voice browsing system 108 from a user's voice enabled device 306 (i.e, any type of wireline or wireless telephone, Internet Protocol (IP) phones, or other special wireless units). The database 300 contains a section that stores the personal recognition grammars and related web site information generated by the clipping client 110. A separate record exists for each web site defined by the user. An example of a user-defined web site record is shown in FIG. 4. Each user-defined web site record 400 contains the recognition grammar 402 assigned by the user, the associated Uniform Resource Locator CURL) 404, and a command that enables the "content extraction agent" 406 and retrieves the appropriate content descriptor file required to generate proper requests to the web site and to properly format received data. The web-site record 400 also contains the timestamp 408 indicating the last time the web site was accessed. The content exaction agent is described in more detail below.

The database 300 may also contain a listing of pre-recorded audio files used to create concatenated phrases and sentences. Further, database 300 may contain customer profile information, system activity reports, and any other data or software servers necessary for the testing or administration of the voice browsing system 108.

Figure 5:
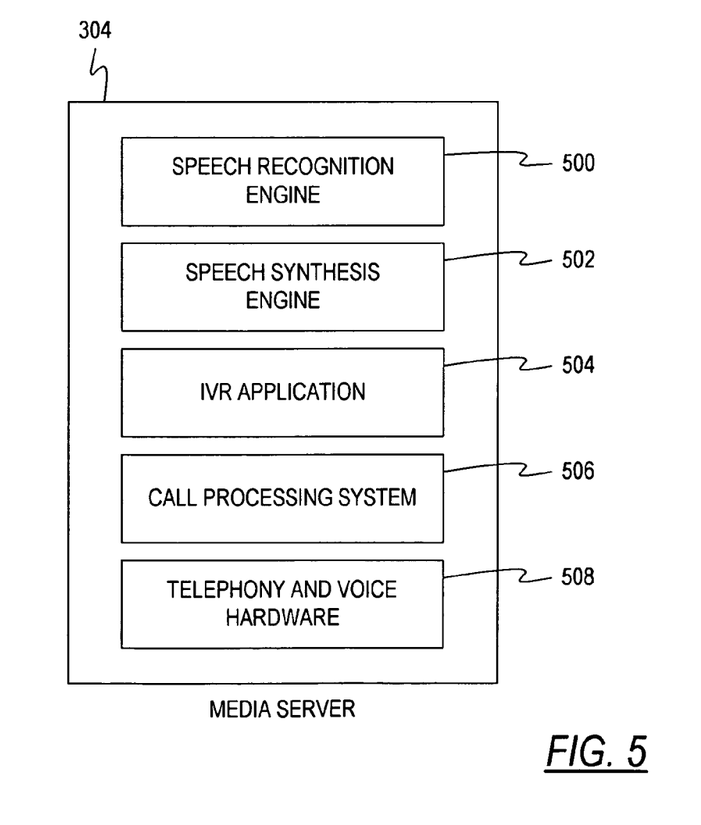
FIG. 5 is a block diagram of a media server used by the preferred embodiment.

The operation of the media servers 304 will now be discussed in relation to FIG. 5. The media servers 304 function as user interface systems since they allow a user to access the voice browsing system 108 via a voice enabled device 306. In the preferred embodiment, the media servers 304 contain a speech recognition engine 500, a speech synthesis engine 502, an Interactive Voice Response (IVR) application 504, a call processing system 506, and telephony and voice hardware 508 that is required to enable the voice browsing system 108 to communicate with the Public Switched Telephone Network (PSTN) 308. In the preferred embodiment, each media server is based upon Intel's Dual Pentium III 730 MHz microprocessor system.

The speech recognition function is performed by a speech recognition engine 500 that converts voice commands received from the user's voice enabled device 306 (i.e., any type of wireline or wireless telephone, Internet Protocol (IP) phones, or other special wireless units) into data messages. In the preferred embodiment, voice commands and audio messages are transmitted using the PSTN 308 and data is transmitted using the TCP/IP communications protocol. However, one skilled in the art would recognize that other transmission protocols may be used. Other possible transmission protocols would include SIP/VoIP (Session Initiation Protocol/Voice over IP), Asynchronous Transfer Mode (ATM) and Frame Relay. A preferred speech recognition engine is developed by Nuance Communications of 1380 Willow Road, Menlo Park, Calif. 94025 (www.nuance.com). The Nuance engine capacity is measured in recognition units based on CPU type as defined in the vendor specification. The natural speech recognition grammars (i e., what a user can say that will be recognized by the speech recognition grammars (i,e., what a user can say that will be recognized by the speech recognition engine) were developed by Webley Systems.

In the preferred embodiment, when a user access the voice browsing system 108, he will be prompted if he would like to use his "user-defined searches." If the user answers affirmatively, the media servers 304 will retrieve from the database 300 the personal recognition grammars 402 defined by the user while using the clipping client 110.

The media servers 304 also contain a speech synthesis engine 502 that converts the data retrieved by the web browsing servers 302 into audio messages that are transmitted to the user's voice enabled device 306. A preferred speech synthesis engine is developed by Lernout and Hauspie Speech Products, 52 Third Avenue, Burlington, Mass. 01803 (www.lh-sl.com)

Figure 6:
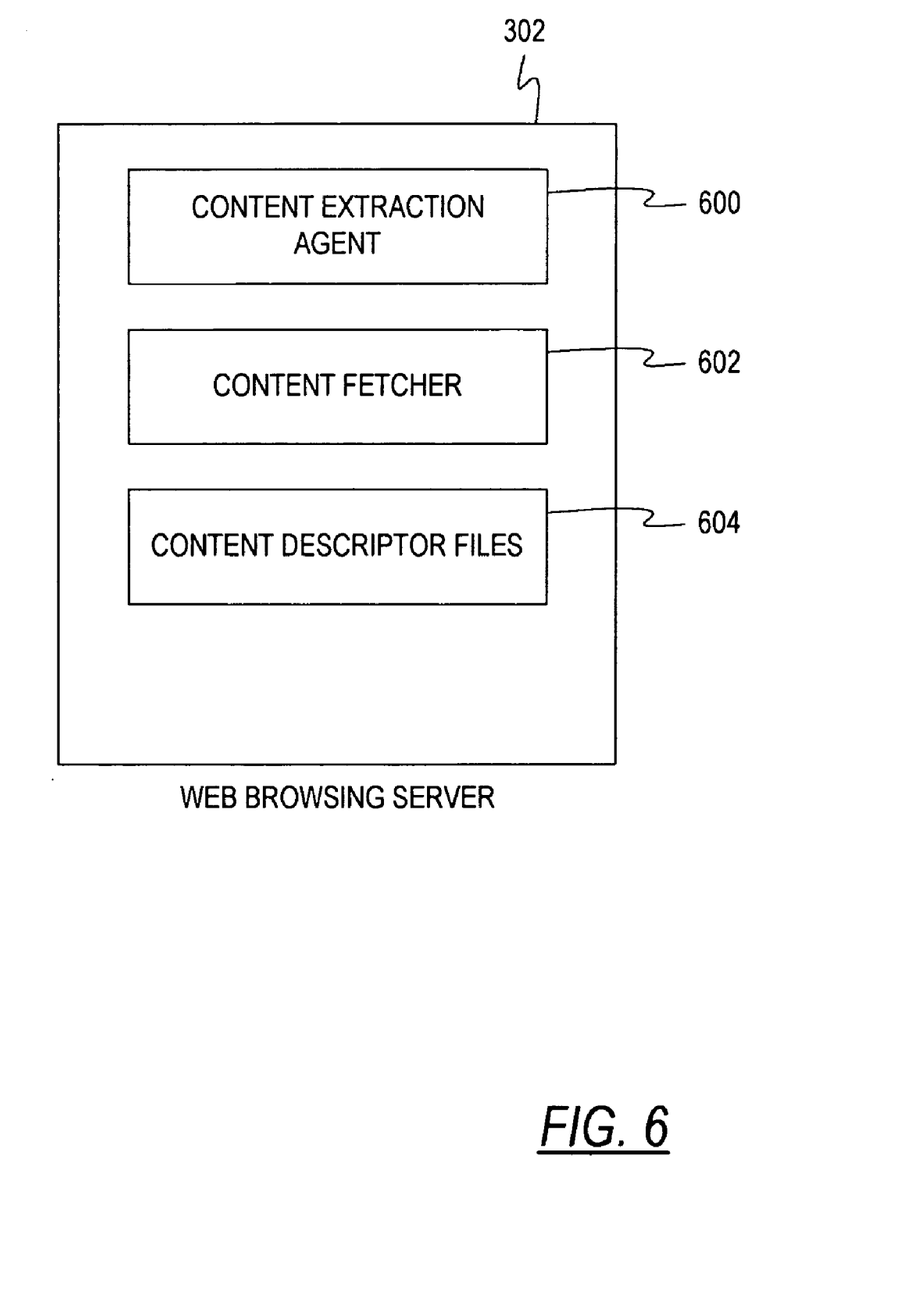
FIG. 6 is a block diagram of a web browsing server used by the preferred embodiment.

A further description of the web browsing server 302 will be provided in relation to FIG. 6. The web browsing servers 302 provide access to data stored on any computer network including the Internet 104, WANs or LANs. The web browsing servers 302 receive responses from web sites 106 and extract the data requested by the user. This task is known as "content extraction." The web browsing server 302 is comprised of a content extraction agent 600, a content fetcher 602, and the content descriptor file 604. Each of these are software applications and will be discussed below.

Upon receiving a user-defined web site record 400 from the database 300 in response to a user request, the web browsing server 302 invokes the "content extraction agent" command 406 contained in the record 400. The content extraction agent 600 retrieves the content descriptor file 604 associated with the user-defined record 400. As mentioned, the content descriptor file 604 directs the extraction agent where to extract data from the accessed web page and how to format a response to the user utilizing that data. For example, the content descriptor file 604 for a web page providing weather information would indicate where to insert the "city" name or ZIP code in order to retrieve Chicago weather information. Additionally, the content descriptor file 604 for each supported URL indicates the location on the web page where the response information is provided. The extraction agent 600 uses this information to properly extract from the web page the information requested by the user.

The content extraction agent 600 can also parse the content of a web page in which the user-desired information has changed location or format. This is accomplished based on the characteristic that most hypertext documents include named objects like tables, buttons, and forms that contain textual content of interest to a user. When changes to a web page occur, a named object may be moved within a document, but it still exists. Therefore, the content extraction agent 600 simply searches for the relevant name of desired object. In this way, the information requested by the user may still be found and reported regardless of changes that have occurred.

Table 2 below contains source code for a content extraction agent 600 used by the preferred embodiment.

TABLE 2

```
#!/usr/local/www/bin/sybperl5
#$Header:
/usr/local/cvsroot/webley/agents/service/web_dispatch.pl,v
1.6
# Dispatches all web requests
#http://wcorp.itn.net/cgi/flstat?carrier=ua&flight_no=155&m
on_abbr=jul&date=
6&stamp=OhLN~PdbuuE*itn/ord,itn/cb/sprint_hd
#http://cgi.cnnfn.com/flightview/rlm?airline=amt&number=300
require "config_tmp.pl";
# check parameters
die "Usage: $0 service [params]\n" if $#ARGV < 1;
#print STDERR @ARGV;
# get parameters
my ( $service, @param ) = @ARGV;
# check service
my %Services = (
                        weather_cnn => 'webget.pl weather_cnn',
                        weather_lycos => 'webget.pl
weather_lycos',
                        weather_weather => 'webget.pl
weather_weather',
                        weather_snap => 'webget.pl
weather_snap',
                        weather_infospace => 'webget.pl
weather_infospace',
                        stockQuote_yahoo => 'webget.pl stock',
                        flightStatus_itn => 'webget.pl
flight_delay',
                        yellowPages_yahoo => 'yp_data.pl',
                        yellowPages_yahoo => 'yp_data.pl',
                        newsHeaders_newsreal => 'news.pl',
                        newsArticle_newsreal => 'news.pl',
                        );
```

TABLE 2-continued

```
# test param
my $date = `date`;
chop ( $date );
my ( $short_date ) = $date =~ /\s+(\w{3}\s+\d{1,2})\s+/;
my %Test = (
                            weather_cnn => '60053',
                            weather_lycos => '60053',
                            weather_weather => '60053',
                            weather_snap => '60053',
                            weather_infospace => '60053',
                            stockQuote_yahoo => 'msft',
                            flightStatus_itn => 'ua 155 ' .
$short_date,
                            yellowPages_yahoo => 'tires 60015',
                            newsHeaders_newsreal => '1',
                            newsArticle_newsreal => '1 1',
                            );
die "$date: $0: error: no such service: $service (check
this script)\n"
unless $Services{ $service };
# prepare absolute path to run other scripts
my ( $path, $script ) = $0 =~ m|^(.*/) ([^/]*) |;
# store the service to compare against datatable
my $service_stored = $service;
# run service
while( ! ( $response = `$path$Services{ $service } @param` )
) {
            # response failed
            # check with test parameters
            $response = `$path$Services{ $service } $Test{
$service }`;
#           print "test: $path$Services{ $service } $Test{
$service }";
            if ( $response )   {
                $service = &switch_service( $service );
#               print "Wrong parameter values were supplied:
$service -
@param\n";
#               die "$date: $0: error: wrong parameters: $service
-
@param\n";
            }
            else {
                # change priority and notify
                $service = &increase_attempt( $service );
            }
}
# output the response
print $response;
sub increase_attempt {
            my ( $service ) = @_;
            my ( $service_name ) = split( /_/, $service );
            print STDERR "$date: $0: attn: changing priority for
service:
$service\n";
            # update priority
            &db_query( "update mcServiceRoute "
                        . "set priority = ( select max( priority
) from
mcServiceRoute "
                        . "where service = '$service_name' ) + 1,
"
                        . "date = getdate( ), "
                        . "attempt = attempt + 1 "
                        . "where route = '$script $service' " );
#           print "---$route===\n";
            # find new route
            my $route = @{ &db_query( "select route from
mcServiceRoute "
                        . "where service =
'$service_name' "
                        . "and attempt < 5
"
                        . "order by
priority ")
                        } -> [ 0 ] { route };
            &db_query( "update mcServiceRoute "
                        . "set attempt = 0 "
                        . "where route = '$script $service' " )
            if ( $route eq "$script $service"
                or $route eq "$script $service_stored" );
            ( $service_name, $service ) = split( /\s+/, $route );
            die "$date: $0: error: no route for the service:
$service (add
more) \n"
                        unless $service;
            return $service;
}
sub switch_service {
            my ( $service ) = @_;
            my ( $service_name ) = split( /_/, $service );
            print STDERR "$date: $0: attn: changing priority for
service:
$service\n";
            # update priority
            &db_query( "update mcServiceRoute "
                        . "set priority = ( select max( priority
) from
mcServiceRoute "
                        . "where service = '$service_name' ) + 1,
"
                        . "date = getdate( ) "
                        . "where route = '$script $service' " );
#           print "---$route===\n";
            # find new route
            my $route = @{ &db_query( "select route from
mcServiceRoute "
                        . "where service =
'$service_name' "
                        . "and attempt < 5
"
                        . "order by
priority ")
                        } -> [ 0 ] { route };
            die "$date: $0: error: there is the only service:
$route (add
more)\n"
            if ( $route eq "$script $service"
                or $route eq "$script $service_stored" );
            ( $service_name, $service ) = split( /\s+/, $route );
            die "$date: $0: error: no route for the service:
$service (add
more)\n"
                        unless $service;
            return $service;
}
```

Table 3 below contains source code of the content fetcher 602 used with the content extraction agent 600 to retrieve information from a web site

TABLE 3

```
#!/usr/local/www/bin/sybper15
#-T
# -w
# $Header:
/usr/local/cvsroot/webley/agents/service/webget.pl,v 1.4
# Agent to get info from the web.
# Parameters: service_name [service_parameters], i.e. stock
msft or weather
60645
# Configuration stored in files service_name.ini
# if this file is absent the configuration is received from
mcServices table
# This script provides autoupdate to datatable if the .ini
file is newer.
$debug = 1;
use URI::URL;
use LWP::UserAgent;
use HTTP::Request::Common;
use Vail::VarList;
use Sybase::CTlib;
use HTTP::Cookies;
#print "Sybase::CTlib $DB_USR, $DB_PWD, $DB_SRV;";
open( STDERR, ">>$0.log" ) if $debug;
```

TABLE 3-continued

```
#open( STDERR, ">&STDOUT" );
$log = `date`;
#$response = `./url.pl
"http://cgi.cnn.com/cgi-bin/weather/redirect?zip=60605"`;
#$response = `pwd`;
#print STDERR "pwd = $response\n";
#$response = `ls`;
#print STDERR "ls = $response\n";
chop( $log );
$log .= "pwd=" . `pwd`;
chop( $log );
#$debug2 = 1;
my $service = shift;
$log .= " $service: " . join( ':', @ARGV ) . "\n";
print STDERR $log if $debug;
#$response = `./url.pl
"http://cgi.cnn.com/cgi-bin/weather/redirect?zip=60605"`;
my @ini = &read_ini( $service );
chop( @ini );
my $section = " ";
do { $section = &process_section( $section ) } while
$section;
#$response = `./url.pl
"http://cgi.cnn.com/cgi-bin/weather/redirect?zip=60605"`;
exit;
#################################################
sub read_ini {
        my ( $service ) = @_;
        my @ini = ( );
        # first, try to read file
        $0 =~ m|^(.*/) [^/]*|;
        $service = $1 . $service;
        if ( open( INI, "$service.ini" ) ) {
                @ini = ( <INI> );
                return @ini unless ( $DB_SRV );
                # update datatable
                my $file_time = time − int( ( −M "$service.ini" )
* 24 *
3600 );
#               print "time $file_time\n";
                my $dbh = new Sybase::CTlib $DB_USR, $DB_PWD,
$DB_SRV;
                unless ( $dbh ) {
                        print STDERR "webget.pl: Cannot connect to
dataserver $DB_SRV:$DB_USR:$DB_PWD\n";
                        return @ini;
                }
                my @row_refs = $dbh->ct_sql( "select lastUpdate
from
mcServices where service = '$service' ", undef, 1 );
                if ( $dbh->{ RC } == CS_FAIL ) {
                        print STDERR "webget.pl: DB select from
mcServices
failed\n";
                        return @ini;
                }
                unless ( defined @row_refs ) {
                        # have to insert
                        my ( @ini_escaped ) = map {
                                ( my $x = $_ ) =~ s/\'/\'\'/g;
                                $x;
                        } @ini;
                        $dbh->ct_sql( "insert mcServices values(
'$service',
'@ini_escaped', $file_time )" );
                        if ( $dbh->{ RC } == CS_FAIL ) {
                                print STDERR "webget.pl: DB insert to
mcServices failed\n";
                        }
                        return @ini;
                }
#               print "time $file_time:".$row_refs[ 0 ]->{
'lastUpdate'
}."\n";
                if ( $file_time > $row_refs[ 0 ]->{ 'lastUpdate'
} ) {
                        # have to update
                        my ( @ini_escaped ) = map {
                                ( my $x = $_ ) =~ s/\'/\'\'/g;
```

TABLE 3-continued

```
                                $x;
                        } @ini;
                        $dbh->ct_sql( "update mcServices set config
= 
'@ini_escaped', lastUpdate = $file_time where service =
'$service' " );
                        if ( $dbh->{ RC } == CS_FAIL ) {
                                print STDERR "webget.pl: DB update to
mcServices failed\n";
                        }
                }
                return @ini;
        }
        else {
                print STDERR "$0: WARNING: $service.ini n/a in "
. `pwd`
                        . "Try to read DB\n";
        }
        # then try to read datatable
        die "webget.pl: Unable to find service $service\n"
unless ( $DB_SRV
);
        my $dbh = new Sybase::CTlib $DB_USR, $DB_PWD,
$DB_SRV;
        die "webget.pl: Cannot connect to dataserver
$DB_SRV:$DB_USR:$DB_PWD\n" unless ( $dbh );
        my @row_refs = $dbh->ct_sql( "select config from
mcServices where
service = '$service' ", undef, 1 );
        die "webget.pl: DB select from mcServices failed\n" if
$dbh->{ RC }
== CS_FAIL;
        die "webget.pl: Unable to find service $service\n"
unless ( defined
@row_refs );
        $row_refs[ 0 ]->{ 'config' } =~ s/\n /\n\r/g;
        @ini = split( /\r/, $row_refs[ 0 ]->{ 'config' } );
        return @ini;
}
#################################################
sub process_section {
        my ( $prev_section ) = @_;
        my ( $section, $output, $content );
        my %Param;
        my %Content;
#       print"######################\n";
        foreach ( @ini ) {
#               print;
#               chop;
                s/\s+$//;
                s/^\s+//;
                # get section name
                if ( /^\[(.*)\]/ ) {
#                       print "$_: $section:$prev_section\n";
                        last if $section;
                        next if $1 eq "print";
#                       next if $prev_section ne " " and
$prev_section ne $1;
                        if ( $prev_section eq $1 ) {
                                $prev_section = " ";
                                next;
                        }
                        $section = $1;
                }
                # get parameters
                push( @{ $Param{ $1 } }, $2 ) if $section and
/([^=]+)=(.*)/;
        }
#       print"+++++++++++++++++++++++++++\n";
        return 0 unless $section;
#       print "section $section\n";
        # substitute parameters with values
        map { $Param{ URL }->[ 0 ] =~ s/$Param{ Input }->[ $_
]/$ARGV[ $_
]/g
        } 0 .. $#{ $Param{ Input } };
        # get page content
        ( $Content{ 'TIME' }, $content ) = &get_url_content(
```

TABLE 3-continued

```
${ $Param{ URL
} } [ 0 ] );
        # filter it
        map {
            if ( /^"([^\"]+)\"([^\"]*)\"/ or
/\/([^\/]+)\/([^\/]*)\//  )
{
                my $out = $2; $content =~ s/$1/$out/g;
            }
        } @{ $Param{ "Pre-filter" } };
#print STDERR $content;
        # do main regular expression
        unless( @values = $content =~ /${ $Param{
Regular_expression } } [ 0
]/ ) {
            &die_hard( ${ $Param{ Regular_expression } } [ 0
], $content
);
            return $section;
        }
        %Content = map { ( $Param{ Output }->[ $_ ], $values[
$_ ] )
        } 0 .. $#{ $Param{ Output } };
        # filter it
        map {
            if ( /([^\"]+)\"([^\"]+)\"([^\"]*)\"/
                or /([^\/]+)\/([^\/]+)\/([^\/]*)\// ) {
                my $out = $3;
                $Content{ $1 } =~ s/$2/$out/g;
            }
        } @{ $Param{ "Post-filter" } };
        # calculate it
        map {
            if ( /([^=]+)=(.*)/ ) {
                my $eval = $2;
                map { $eval =~ s/$_/$Content{ $_ }/g
                } keys %Content;
                $Content{ $1 } = eval( $eval );
            }
        } @{ $Param{ Calculate } };
        # read section [print]
        foreach $i ( 0 .. $#ini ) {
            next unless $ini[ $i ] =~ /^\[print\]/;
            foreach ( $i + 1 .. $#ini ) {
                last if $ini[ $_ ] =~ /^\[.+\]/;
                $output .= $ini[ $_ ] . "\n";
            }
            last;
        }
        # prepare output
        map { $output =~ s/$_/$Content{ $_ }/g
        } keys %Content;
        print $output;
        return 0;
}
############################################
sub get_url_content {
        my ( $url ) = @_;
        print STDERR $url if $debug;
#       $response = `./url.pl '$url'`;
        $response = `./url.pl '$url'`;
        return( $time - time, $response );
        my $ua = LWP::UserAgent->new;
        $ua->agent( 'Mozilla/4.0 [en] (X11; I; FreeBSD 2.2.8-
STABLE i386) '
);
#       $ua->proxy( ['http', 'https'],
'http://proxy.webley:3128/' );
#       $ua->no_proxy( 'webley', 'vail' );
        my $cookie = HTTP::Cookies->new;
        $ua->cookie_jar( $cookie );
        $url = url $url;
        print "$url\n" if $debug2;
        my $time = time;
        my $res = $ua->request( GET $url );
        print "Response: " . ( time - $time ) . "sec\n" if
$debug2;
        return( $time - time, $res->content );
}
```

TABLE 3-continued

```
############################################
sub die_hard {
        my( $re, $content ) = @_;
        my ( $re_end, $pattern );
        while( $content !~ /$re/ ) {
            if ( $re =~ s/(\(([^\(\)]+\) [^\(\)]*$)// ) {
                $re_end = $1 . $re_end;
            }
            else {
                $re_end = $re;
                last;
            }
        }
        $content =~ /$re/;
        print STDERR "The regular expression did not match:\n
$re\n
Possible misuse:
$re_end:\n
Matched:
$&\n
Mismatched:
$'\n
" if $debug;
            if ( $debug ) {
                print STDERR "Content:\n $content\n" unless
$';
            }
}
############################################
```

Once the web browsing server 302 accesses the web site specified in the URL 404 and retrieves the requested information, it is forwarded to the media server 304. The media server uses the speech synthesis engine 502 to create an audio message that is then transmitted to the user's voice enabled device 306. In the preferred embodiment, each web browsing server is based upon Intel's Dual Pentium III 730 MHz microprocessor system.

Figure 3:
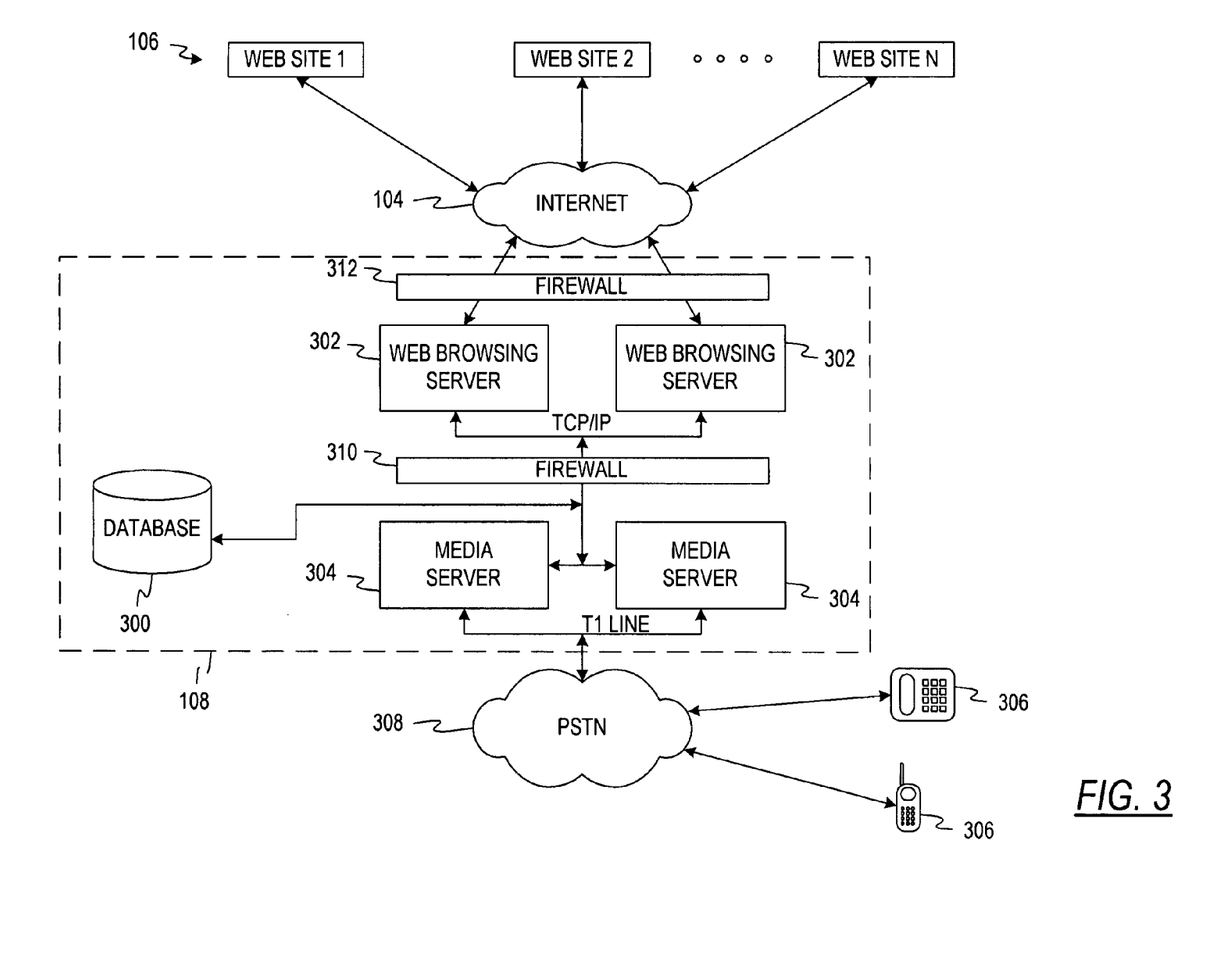
FIG. 3 is a block diagram of a voice browsing system used with preferred embodiment of the present invention.
Figure 4:
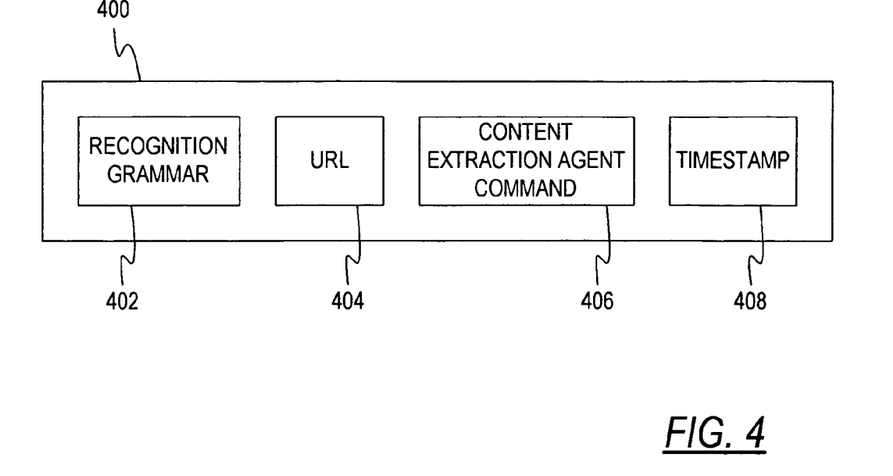
FIG. 4 is a block diagram of a user-defined database record created by preferred embodiment of the present invention.

Referring to FIG. 3, the operation of the personal voice-based information retrieval system will be described. A user establishes a connection between his voice enabled device 306 and a media server 304 of the voice browsing system 108. This may be done using the Public Switched Telephone Network (PSTN) 308 by calling a telephone number associated with the voice browsing system 108. Once the connection is established, the media server 304 initiates an interactive voice response (IVR) application. The IVR application plays audio message to the user presenting a list of options, which includes "perform a user-defined search." The user selects the option to perform a user-defined search by speaking the name of the option into the voice enabled device 306.

The media server 304 then accesses the database 300 and retrieves the personal recognition grammars 402. Using the speech synthesis engine 502, the media server 304 then asks the user, "Which of the following user-defined searches would you like to perform" and reads to the user the identification name, provided by the recognition grammar 402, of each user-defined search. The user selects the desired search by speaking the appropriate speech command or pronounceable name described within the recognition grammar 402. These speech recognition grammars 402 define the speech commands or pronounceable names spoken by a user in order to perform a user-defined search. If the user has a multitude of user-defined searches, he may speak the command or pronounceable name described in the recognition grammar 402 associated with the desired search at anytime without waiting for the media server 304 to list all available user-defined searches. This feature is commonly referred to as a "barge-in" feature.

The media server 304 uses the speech recognition engine 500 to interpret the speech commands received from the user. Based upon these commands, the media server 304 retrieves the appropriate user-defined web site record 400 from the database 300. This record is then transmitted to a web browsing server 302. A firewall 310 may be provided that separates the web browsing server 302 from the database 300 and media server 304. The firewall provides protection to the media server and database by preventing unauthorized access in the event the firewall 312 for the web browsing server fails or is compromised. Any type of firewall protection technique commonly known to one skilled in the art could be used, including packet filter, proxy server, application gateway, or circuit-level gateway techniques.

The web browsing server 302 accesses the web site 106 specified by the URL 404 in the user-defined web site record 400 and retrieves the user-defined information from that site using the content extraction agent and specified content descriptor file specified in the content extraction agent command 406. Since the web browsing server 302 uses the URL and retrieves new information from the Internet each time a request is made, the requested information is always updated.

The content information received from the responding web site 106 is then processed by the web browsing server 302 according to the associated content descriptor file. This processed response is then transmitted to the media server 304 for conversion into audio messages using either the speech synthesis engine 502 or selecting among a database of prerecorded voice responses contained within the database 300.

It should be noted that the web sites accessible by the personal information retrieval system and voice browser of the preferred embodiment may use any type of mark-up language, including Extensible Markup Language (XML), Wireless Markup Language (WML), Handheld Device Markup Language (HDML), Hyper Text Markup Language (HTML), or any variation of these languages.

The descriptions of the preferred embodiments described above are set forth for illustrative purposes and are not intended to limit the present invention in any manner. Equivalent approaches are intended to be included within the scope of the present invention. While the present invention has been described with reference to the particular embodiments illustrated, those skilled in the art will recognize that many changes and variations may be made thereto without departing from the spirit and scope of the present invention. These embodiments and obvious variations thereof are contemplated as falling within the scope and spirit of the claimed invention.

I claim:

1. A method for allowing users to use speech commands to obtain information from a pre-defined portion of a pre-selected web site in audio format, said method comprising the steps of:
    (a) providing a computer having a speech processor, said computer being operatively connected to the internet and to at least one phone;
    (b) providing a URL to said computer, said URL indicating a pre-selected web site from which the information is to be retrieved;
    (c) using said computer to designate a pre-defined portion of the pre-selected web site which contains the information to be retrieved;
    (d) using said computer to identify a named object associated with the content of the information to be retrieved;
    (e) using said computer to generate a regular expression based on said pre-defined portion of said pre-selected web site and said named object, said regular expression corresponding to said content of said information to be retrieved, wherein said regular expression is a text string used for describing a search pattern;
    (f) providing a speech command to said speech processor, said speech command corresponding to said regular expression;
    (g) said speech processor converting said speech command to a digital-form command;
    (h) said computer receiving said digital-form command from said speech processor, said computer assigning said regular expression to said digital-form command;
    (i) after steps (a) through (h) are completed, transmitting an audio speech command to said speech processor, said speech command corresponding to said regular expression;
    (j) said speech processor converting said speech command to said digital-form command;
    (k) said computer receiving said digital-form command from said speech processor;
    (l) said computer retrieving said regular expression corresponding to said digital-form command;
    (m) said computer retrieving the information from the pre-defined portion of the pre-selected web site corresponding to said regular expression when the requested information is found in the pre-defined portion of the pre-selected website;
    (n) said computer searching said pre-selected web site for said named object when the requested information is not found in the pre-defined portion of the pre-selected web site;
    (o) said computer providing said retrieved information to said speech processor;
    (p) said speech processor converting said retrieved information into an audio message; and
    (q) said speech processor forwarding said audio message to a user.

2. The method of claim 1 wherein the pre-defined portion of the pre-selected web site being retrieved is periodically updated.

3. The method of claim 1 wherein the step of providing a URL to a computer is performed by a user.

4. The method of claim 1 wherein the step of using said computer to designate a pre-defined portion of the web site which contains the information to be retrieved comprises the steps of:
    displaying the web site on a graphical display operatively connected to the computer; and
    using computer software to select the pre-defined portion of the pre-selected web site which contains the information to be retrieved.

5. The method of claim 4 wherein the step of using said computer to designate a pre-defined portion of the web site which contains the information to be retrieved is performed by a user.

6. A system for retrieving information from a pre-defined portion of a pre-selected web site by uttering speech commands into a phone and for providing to a user retrieved information in an audio form, said system comprising:
    a server, said server operatively connected to the internet and to at least one phone, said server comprising:
        telephony hardware, said telephony hardware operatively connected to said phone and to said server;
        at least one speech recognition engine, said speech recognition engine operatively connected to said server and to said telephony hardware;

a speech synthesis engine, said speech synthesis engine operatively connected to said server and to said telephony hardware; and a call processing system, said call processing system configured to receive speech commands through said telephony hardware and forward said speech commands to said speech recognition engine and said call processing system further configured to receive an audio message from said speech synthesis engine and forward said audio message through said telephony hardware;

a first instruction set stored on said server, said first instruction set configured to identify the pre-defined portion of the pre-selected web site and to identify a named object associated with the content of the information to be retrieved, said pre-defined portion containing the information to be retrieved from the web site, said first instruction set comprising:
 a uniform resource locator address for said web site; and
 the named object;

a second instruction set stored on said server, said second instruction set configured to generate a regular expression based on said pre-defined portion of said pre-selected web site and said named object, said regular expression corresponding to said content of said information to be retrieved, wherein said regular expression is a text string used for describing a search pattern;

a recognition grammar corresponding to each said instruction set and corresponding to a speech command;

said speech recognition engine configured to receive said speech command and to select the corresponding recognition grammar, said speech recognition engine further configured to retrieve each said instruction set corresponding to said recognition grammar upon receiving said speech command;

a web browser operatively connected to said server, said web browser including at least a content extraction agent, a content fetcher, and a content descriptor file, said web browser configured to access said pre-defined portion of said web she defined by said instruction sets and to retrieve said information defined by said instruction sets;

said speech synthesis engine configured to convert the retrieved information from said pre-defined portion of said pre-selected web site into an audio message, and said speech synthesis engine further configured to transmit said audio message to said user.

7. The system of claim 6 wherein the phone is a landline telephone.

8. The system of claim 6 wherein the phone is a wireless telephone.

9. The system of claim 6 wherein the phone is an internet protocol telephone.

10. The system of claim 6 wherein the server is operatively connected to a local area network.

11. The system of claim 6 wherein the server is operatively connected to a wide area network.

12. The system of claim 6 wherein the server is operatively connected to the Internet.

13. The system of claim 6 further comprising a database operatively connected to the server, the database configured to store said instruction set and said recognition grammars.

14. The system of claim 6 further comprising computer software stored on the server, said computer software configured to create said instruction set based on user-defined information.

15. The system of claim 6 further comprising:
 a graphical display operatively connected to the server, said graphical display configured to display the pre-selected web site; and
 computer software stored on the server, said computer software configured to select the pre-defined portion of the pre-selected web site which contains the information to be retrieved.

16. A method for allowing a phone user to set up and subsequently retrieve information in an audio format from a pre-defined portion of a pre-selected web she, said method comprising the steps of:
 providing a server operatively connected to the internet and to at least one phone, said server being operatively connected to a speech recognition engine and to a speech synthesis engine;
 providing a first instruction set stored on said server for identifying the pre-defined portion of a pre-selected web she containing the content of the information to be retrieved from the web site, said first instruction set comprising:
  a uniform resource locater address for said web site; and
  a named object associated with the content of the information to be retrieved;
 providing a second instruction set stored on said server for generating a regular expression based on said pre-defined portion of said pre-selected web site and said named object, said regular expression corresponding to said content of said information to be retrieved, wherein said regular expression is a text string used for describing a search pattern;
 providing a speech command to said speech recognition engine, said speech command corresponding to said instruction sets;
 said speech recognition engine assigning said speech command to a recognition grammar, said speech command and said recognition grammar corresponding to each said instruction set;
 transmitting said speech command to said speech recognition engine;
 said speech recognition engine receiving said speech command and selecting the corresponding recognition grammar;
 said server retrieving each said instruction set corresponding to said recognition grammar;
 said server accessing said pre-defined portion of said pre-selected web site defined by said instruction sets and retrieving said information defined by said instruction sets when the requested information is found in the pre-defined portion of the pre-selected web site;
 said server searching said pre-selected website when the requested information is not found in the pre-defined portion of the pre-selected web site;
 said speech synthesis engine converting the retrieved information from said pre-selected web site into an audio message; and
 said speech synthesis engine transmitting said audio message to said user.

17. The method of claim 16 wherein the step of providing at least one instruction set to the server is performed by the user.

18. The method of claim 16 wherein the step of providing at least one instruction set to the server comprises the steps of:

displaying the web site on a graphical display operatively connected to the server; and using computer software to select the pre-defined portion of the pre-selected web site which contains the information to be retrieved.

19. The method of claim 18 wherein the step of providing at least one instruction set to the server is performed by the user.

20. The method of claim 16 wherein the pre-defined portion of the pre-selected web site being retrieved is periodically updated.

21. The system of claim 6 wherein the named object is selected from the group consisting of: "weather", "forecast", "high", "low", "radar", "temp", "temperature", "humidity", "humidity level", "wind", "wind speed", "wind direction", "pressure", "sunrise", "sunset", "time", "month", "day", "stock", "stock quote", "news", "news reel", "airline", "carrier", "flight", and "flight number".

* * * * *